United States Patent [19]
Lam et al.

[11] Patent Number: 5,569,077
[45] Date of Patent: Oct. 29, 1996

[54] DIRECTIONAL VENT REGISTER

[76] Inventors: Peter K. F. Lam, 2743 Nadina Dr., Coquitlam, Canada; Nigel B. Chivers, 20264 53rd Ave., Langley, Canada

[21] Appl. No.: 381,199

[22] Filed: Jan. 31, 1995

[51] Int. Cl.⁶ .................................................. F24F 13/12
[52] U.S. Cl. ........................ 454/290; 454/289; 454/307; 454/316
[58] Field of Search ........................ 454/284, 289, 454/290, 306, 307, 309, 316, 327, 332

[56] References Cited

U.S. PATENT DOCUMENTS

| | | |
|---|---|---|
| Re. 20,788 | 7/1938 | Eckenroth ........................ 454/327 |
| D. 315,790 | 3/1991 | Koessler ........................ D23/388 |
| 848,758 | 4/1907 | Meibeyer . |
| 1,571,631 | 2/1926 | Krueger ........................ 454/289 |
| 1,691,285 | 11/1928 | Helms ........................ 454/290 |
| 3,628,441 | 12/1971 | Ardussi et al. ........................ 454/290 |
| 4,633,770 | 1/1987 | Taylor et al. ........................ 454/316 X |
| 5,230,657 | 7/1993 | Opoka ........................ 454/289 |
| 5,232,403 | 8/1993 | Marotta ........................ 454/289 |

*Primary Examiner*—Harold Joyce
*Attorney, Agent, or Firm*—Todd N. Hathaway

[57] ABSTRACT

A directional vent register having a primary grill in a generally conventional position in a top plate which pivots to expose and open a secondary grill which directs the air in a forward direction.

14 Claims, 5 Drawing Sheets

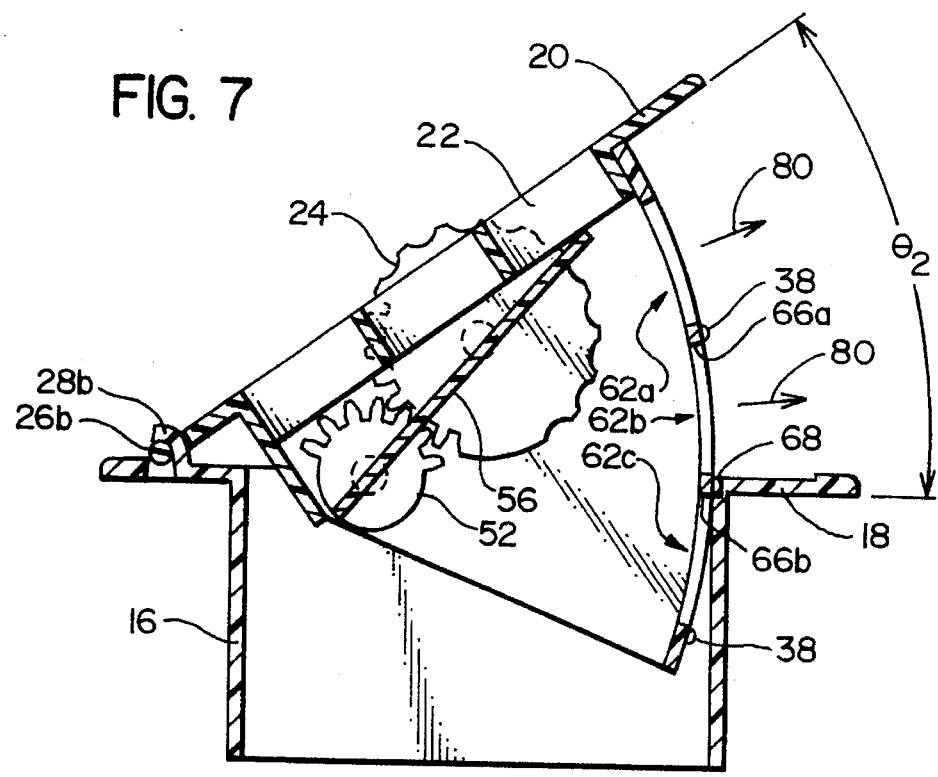
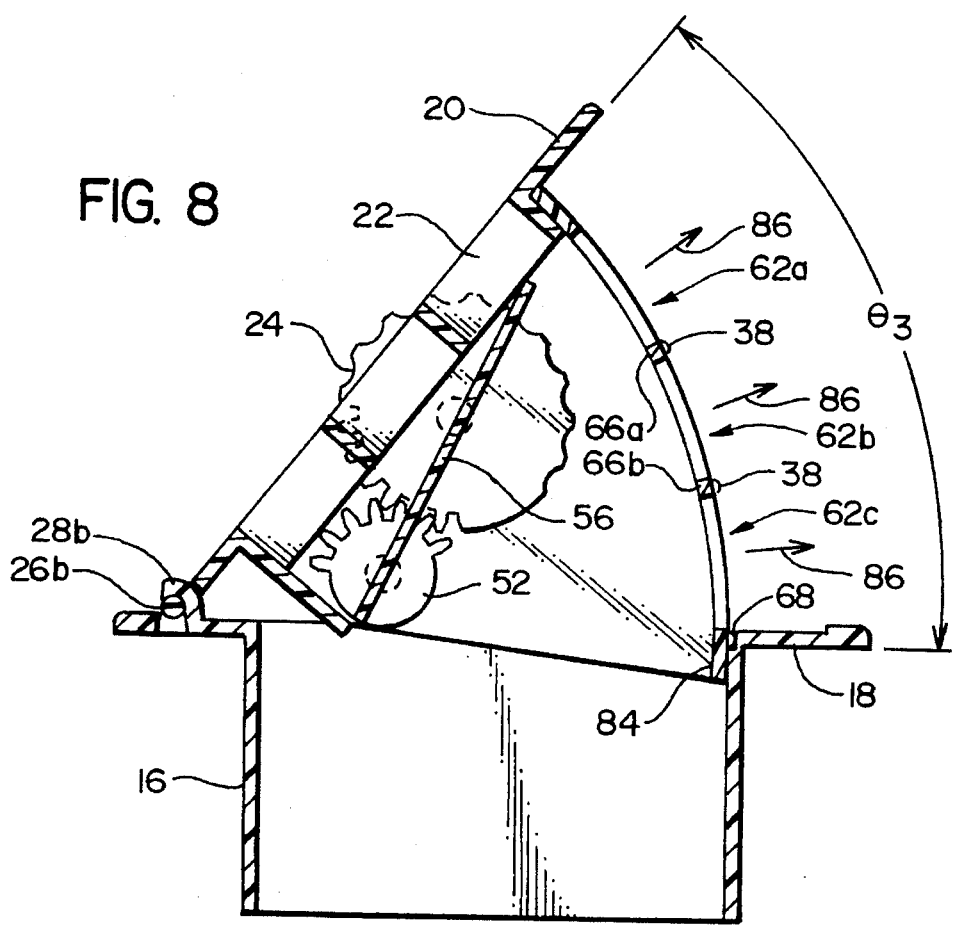

DIRECTIONAL VENT REGISTER

FIELD OF THE INVENTION

The present invention relates generally to vent registers for forced air heating/cooling systems, and, more particularly to a vent register which allows for the adjustable redirection of the flow of air entering a room.

BACKGROUND OF THE INVENTION

Vent registers are normally fitted to the outlets of forced-air heating and cooling systems. Conventional vent registers are typically simple metal, plastic, or wood grates which direct the airflow in a generally upward direction, sometimes with a degree of dispersion being imparted by the vanes of the diffuser. Many situations exist, however, in which it would be desirable to deflect the airflow in a more horizontal direction, either temporarily or on a permanent basis. For example, vent outlets are frequently located adjacent the walls of a room, so that the air flows generally upwardly therefrom. In some circumstances, however, it is desirable to direct the airflow more toward the center of the room, or toward a particular location, such as a chair or seating area. Furthermore, it frequently happens that a sofa, chair, or other piece of furniture is placed against the wall in front of or above the vent register, so that airflow is impeded or misdirected.

One device which is commonly employed in an attempt to redirect the airflow consists of a curved plastic deflector structure which is mounted to a vent register by means of magnets which are attached to the base of the structure. Devices of this type enjoy the advantage of simplicity, but are in many respects unsatisfactory in service. Firstly, the device is easily displaced or kicked off of the register due to the weak mounting which is provided by the magnets, and the flimsy structure is easily broken and tends to become dirty very quickly. Moreover, the mounting magnets are useless with the plastic vent registers which are becoming increasingly common in new construction.

A number of somewhat more ingenious devices have been proposed for redirecting the airflow from a forced-air vent. However, these devices exhibit a number of other deficiencies, particularly for use in a modern dwelling. For example, the devices which are disclosed in U.S. Pat. Nos. 848,758 (Meibeier) and 1,691,285 (Helms) are both of multi-plate steel construction, replete with sliding joints, springs, operating chains, and so forth. Not only is this form of construction uneconomical and unsightly, it is given to unacceptable levels of wear and damage over an extended period of use. Moreover, both of these devices share a significant drawback in the manner in which the deflection structure is deployed; in particular, both devices employ an arcuate deflection assembly which extends from the rearward edge of the vent and curves upwardly and forwardly toward the intended direction of airflow As a result, the devices are incapable of redirecting the airflow in a horizontal direction without the back shield being pretty much fully extended, which is simply not possible in many cases; for example, in many situations the register may be positioned beneath a sofa or other piece of furniture which provides insufficient clearance to allow such extension. Moreover, these structures deflect the entire airflow in the direction of the discharge opening, and the operator is not provided with the option of diverting a portion of the airflow while permitting the balance to continue in its initial direction, e.g., in a generally upward direction above the register. Still further, from an aesthetic standpoint, the appearance of the extensible and telescoping deflector assemblies of these devices may best be described as "obtrusive" for a modern home environment.

U.S. Pat. No. 5,232,403 (Marotta) discloses what appears to be essentially a modern equivalent of the earlier devices, and this particularly resembles that which is disclosed in the Helms '285 patent. In particular, the Marotta device features first and second telescoping, arcuate panels or sheets 20, 22 which extend from the rearward edge of the register. With the possible exception of aesthetic qualities, this device exhibits the same drawbacks as those which have been described above. Moreover, the unsupported arcuate plastic panels make for a flimsy and easily damaged structure when in the deployed configuration.

A somewhat different device is disclosed in U.S. Pat. No. 5,230,657 (Opoka). This discloses a collapsible air register cover having pleated, accordion-like structures at each end, which expand to allow the cover to pivot upwardly in response to forced air flowing through the register. The primary purpose of the device is to close off the vent when air is not flowing, in the interest of cleanliness and energy savings, although it also diverts the direction of the airflow. The Opoka device exhibits a number of deficiencies similar to those which have been discussed above, including the fact that the entire airflow is diverted and there is no possibility of a partial deflection of the flow. Moreover, the structure (which is described as being constructed of "space age plastics" and "a super lightweight material . . . such as Mylar") is suspect from the standpoint of durability.

Accordingly, there exists a need for an economical and durable vent register for providing partial or complete deflection of the airflow into a selected, generally horizontal direction. Furthermore, there exists a need for a device which can achieve such deflection in circumstances where the vertical clearance is restricted by furniture or other obstructions. So further, there is a need for such a device which is easily and quickly adjustable by an operator, and which is resistant to damage when in its deployed configuration.

SUMMARY OF THE INVENTION

The present invention has solved the problems cited above, and is a ventilation register for selectively diverting a flow of air passing therethrough. Broadly, this comprises: (a) a fixed flange section configured to be mounted to a discharge opening of a ventilation duct; and (b) a pivoting deflector section for selectively diverting a flow of air from the duct opening, the deflector section comprising: a top plate portion having a primary grill formed therein for passage of the flow of air therethrough; a front panel portion extending downwardly from a front edge of the top plate portion and having a secondary grill formed therein for passage of the flow of air therethrough; and hinge means interconnecting a rearward edge of the top plate portion of the deflector section to a rearward edge of the fixed flange section so as to permit the deflector section to be pivoted from a first position in which the top plate portion thereof lies substantially flush with a horizontal upper surface of the flange section so that the flow of air passes through the primary grill in a generally vertical direction, to a second position in which the front panel portion extends above the upper surface of the flange section so as to permit at least a portion of the flow of air to be deflected through the secondary grill in the front panel portion in a generally horizontal direction.

The secondary grill in the front panel portion may comprise a grill portion of the front panel member having at least one opening therein which extends downwardly over a predetermined angular distance, so that pivoting the deflector assembly upwardly from a first angular position to a second angular position increases an area of the opening which is exposed above the sleeve portion, so as to increase an amount of the air flow which can pass through the secondary grill opening.

Preferably, the ventilation register further comprises means for selectively controlling the flow of air which passes through the primary and secondary grills. The means for selectively controlling the flow of air may comprise a flap member having a first position in which the flow of air is directed by the flap member through the primary grill in the top plate and a second position in which the flow of air is directed by the flap member through the secondary grill in the front panel.

The fixed flange section of the register assembly may comprise a generally rectangular, vertically-extending sleeve portion which is configured to be received in the discharge opening of the ventilator duct. The front panel portion of the deflector section, in turn, may comprise an arcuate panel member which extends downwardly from the forward edge of the top plate portion and is received in the sleeve portion of the flange section, the panel member having a curved outer surface which is configured to tangentially engage an inner surface of the sleeve portion as the deflector section is pivoted about the hinge means. Furthermore, the curved outer surface of the arcuate panel member may frictionally engage the inner surface of the sleeve portion so as to form a sliding fit therewith.

The ventilation register may further comprise means for holding the deflector section in at least one predetermined angular orientation. The means for holding the deflector section in at least one predetermined angular orientation may comprise at least one lug member which extends outwardly from the arcuate panel member, and at least one receptacle formed in the inner surface of the sleeve portion for receiving the lug member so as to hold the deflector section in its predetermined angular orientation.

BRIEF DESCRIPTION OF THE DRAWINGS

FIG. 7 is a cross-sectional view similar to FIG. 5, showing the deflector subassembly pivoted to a second, intermediate open position ($\Theta_2$) in which an additional portion of the secondary grate is exposed to permit the flow of air therethrough, thereby increasing the total airflow from the vent relative to that which is supplied by the assembly in the orientation ($\Theta_1$) which is shown in FIG. 5;

FIG. 8 is a cross-sectional view similar to FIG. 7, showing the deflector subassembly pivoted to a third, fully open position ($\Theta_3$), in which the secondary grate is fully exposed so as to permit a maximum flow of air therethrough, and also showing the manner in which protruding lugs formed on the outer surface of the secondary grate engage corresponding recesses in the flange portion of the assembly so as to retain the deflector subassembly in its extended positions.

DETAILED DESCRIPTION a. Structure

Figure 1:
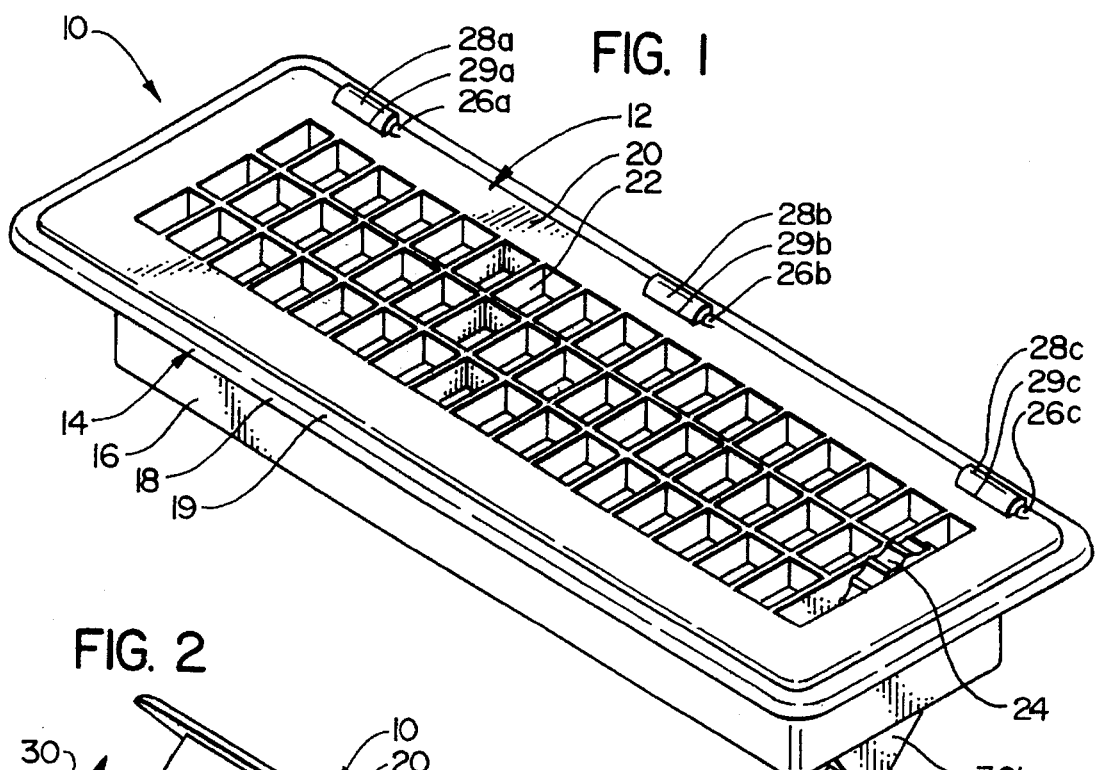
FIG. 1 is a perspective view of a vent register assembly in accordance with the present invention, showing the deflector portion thereof in the retracted position so that the airflow passes through a primary grate in a generally vertical direction.
Figure 2:
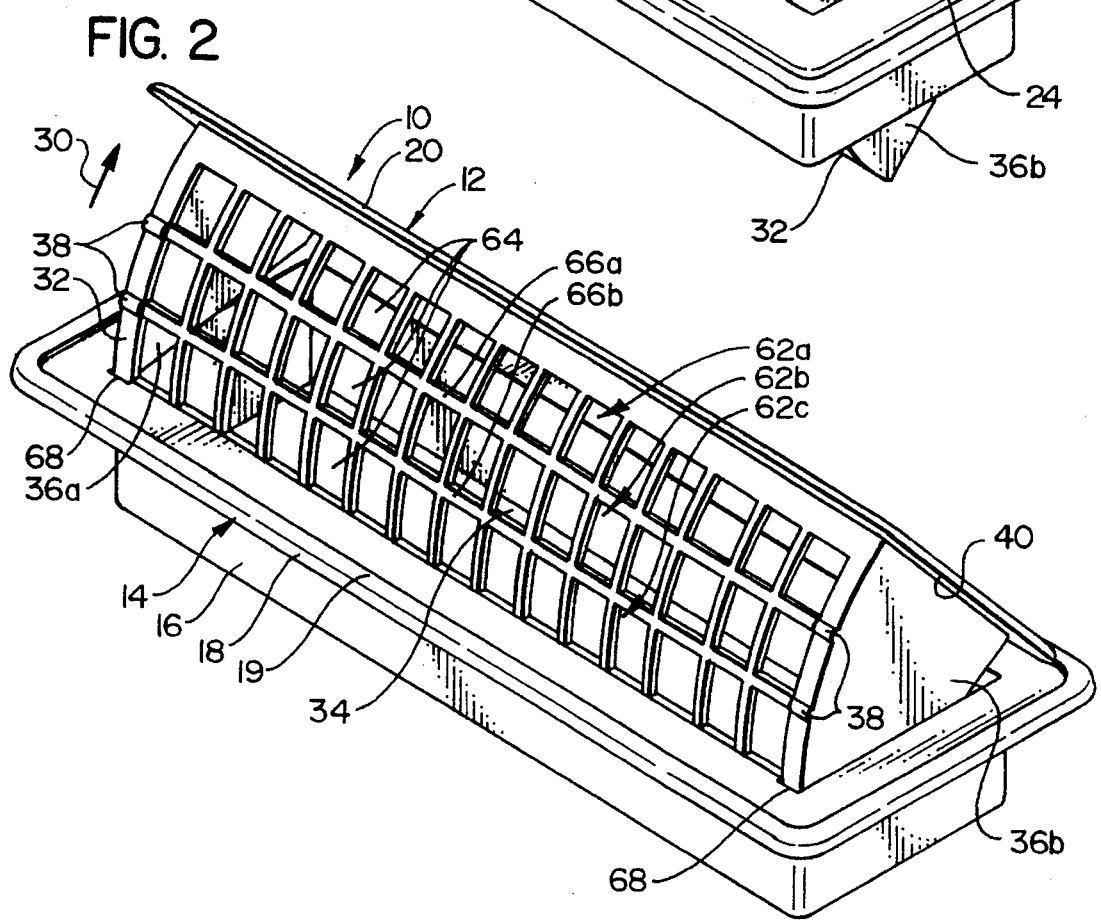
FIG. 2 is a perspective view of the vent register assembly of FIG. 1, showing the deflector portion thereof pivoted to an extended, open position in which all or part of the airflow passes through a secondary, frontal grate and is directed in a generally horizontal direction.

As can be seen in FIGS. 1 and 2, the vent register assembly 10 of the present invention is made up of two major subassemblies, i.e., a pivoting deflector subassembly 12 and a stationary flange subassembly 14.

The flange subassembly is mountable in the vent opening of a conventional forced air heating/cooling system, much in the same manner as the corresponding portions of conventional vent registers are mountable therein. Accordingly, the flange portion comprises a generally rectangular sleeve portion 16 which slides into and frictionally engages the vent opening of the heating/cooling system (the latter generally being fabricated of sheet metal or similar material), and a perimeter flange portion 18 which extends around the upper end of the sleeve portion and engages the surface of the floor to retain the assembly in place and also to form a trim piece which covers the area between the vent opening and the floor or floor covering. Also, the perimeter flange portion is provided with an upwardly extending border 19 about its outer edge.

The deflector subassembly 12, in turn, comprises a generally rectangular top plate 20 which is configured to fit closely within the recess which is formed by the border of the perimeter flange. The generally rectangular central area of top plate 20 is provided with perforations or openings which form the primary grate 22, and at one end of this area the upper edge of a thumb wheel 24 protrudes slightly above the surface of the plate for operation of the control flap, as will be described below.

A series of hinge pins 26a–26c are formed along the rearward edge of the top plate 20 (for purposes of discussion, the term "rearward" as used herein will refer to those portions which are normally, but not always, disposed toward the wall of the room, and "forward" will refer to those portions which are normally disposed towards the open, central area of the room) and are press-fit engaged by hook members 28a–28c which extend upwardly from the underlying perimeter flange 18 through openings 29a–29c formed in top plate 20.

These interfitting members form a hinge joint along the rearward edge of the top plate which enables the forward edge of the deflector subassembly to be pivoted upwardly from the flange subassembly, in the direction indicated by arrow 30 in FIG. 2. This exposes the arcuate front panel 32 and the generally rectangular secondary grate 34. Curved end plates 36a, 36b extend between the top plate and front panel 32 so as to enclose the ends of the deflector subassembly, thereby increasing the efficiency of the assembly in directing the airflow through the grates, and also providing the assembly with enhanced strength and rigidity in the extended position. The front panel and end plates of the deflector subassembly engage the internal surfaces of sleeve 16 so as to form a slight friction fit therewith which enhances smooth, pivoting motion of the assembly. Additionally, small lugs 38 protrude forwardly along the edges of the front panel and engage corresponding receptacles in the flange subassembly so as to hold the deflector subassembly in predetermined extended positions, as will be described in greater detail below.

As can be seen in FIG. 2, the edges of top plate 20 extend outwardly beyond the front and end panels of the deflector subassembly, so as to form an upper perimeter flange 40. In the closed position, the upper perimeter flange abuts flange portion 18 within the recess which is formed by border portion 19, thereby ensuring a relatively tight seal between the two, and also reducing the opportunity for dirt to collect in the assembly; in the open positions, flange portion 40 serves as a finger grip to assist the operator in adjusting the angular position of the deflector subassembly.

Figure 3:
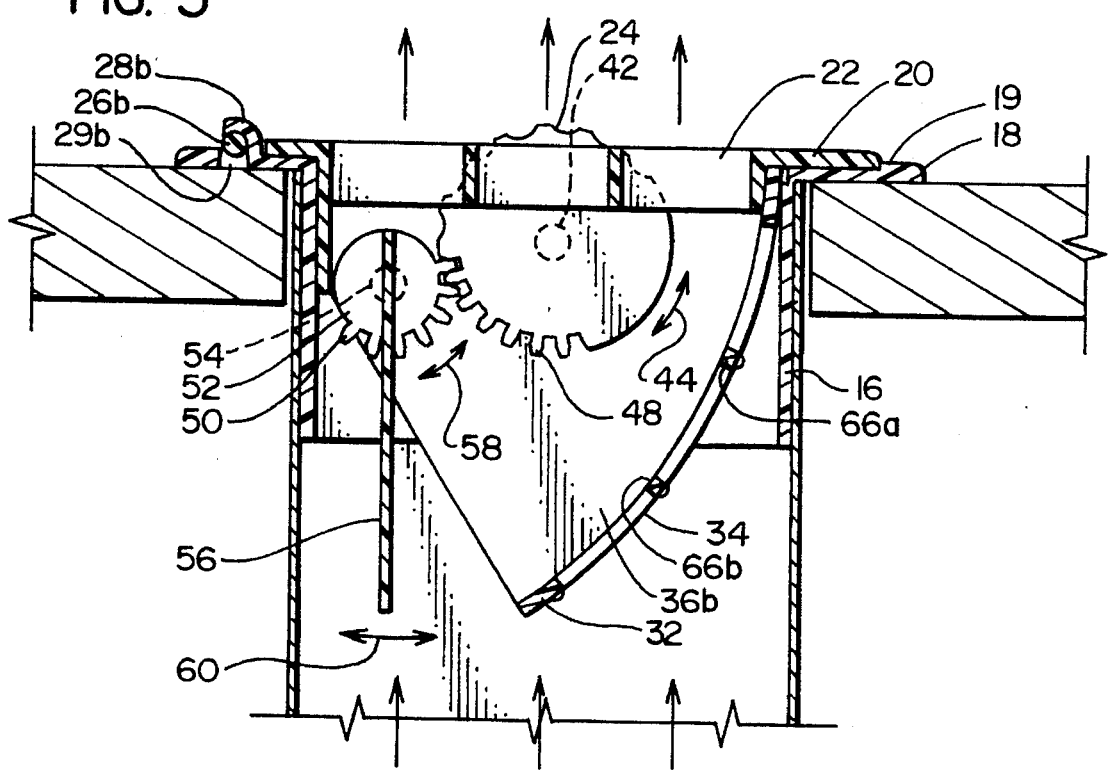
FIG. 3 is an end view of a cross-section taken transversely through the vent register assembly of FIGS. 1–2 showing the deflector subassembly in the retracted (closed) position and the control flap in the open position so that unrestricted airflow passes through the primary grate in the generally vertical direction.

As was noted above, thumb wheel 24 enables the operator to selectively position the control flap of the assembly. As can be seen in FIG. 3, the thumb wheel is mounted to the end wall 36b of the deflector assembly for rotation about a pivot pin 42, in the directions indicated by arrow 44. The upper, protruding quadrant of the thumb wheel is provided with a notched surface 24 which enhances the grip which is offered thereby to the operator's thumb, while the lower quadrant is provided with a series of gear teeth 48. These engage corresponding gear teeth 50 on a secondary gear wheel 52. The secondary gear wheel is rotatably mounted to end wall 36b by pivot pin 54, and the control flapper 56 is mounted to the secondary gear wheel for rotation therewith. The control flapper extends substantially the full length of the deflector subassembly. As will be described in greater detail below, rotation of the thumb wheel in the directions indicated by arrow 44 results in motion of the secondary gear wheel and control flapper in the directions indicated by arrows 58 and 60, respectively, allowing the operator to selectively control the flow of air through the primary and secondary grates of the assembly.

b. Operation

When the deflector subassembly is in the closed position (see FIG. 1), the airflow passes through the primary grate in a generally vertical direction, with the rate of flow being adjustable by means of the thumb-operated control flap. Then, when the operator wants to redirect the airflow, he grasps the primary grill (the openings being sized large enough to receive a person's fingers) and pulls the top plate upwardly so that this pivots in the direction which is indicated by arrow 30 in FIG. 2 and exposes the secondary grate 34 in front panel 32.

The secondary grate 34 is made up of several (e.g., three, in the embodiment which is illustrated) horizontal rows or banks 62a, 62b, 62c of openings 64, which are separated by horizontally extending stringers 66a, 66b. The protruding locking lugs 38 at the ends of the stringers, and are in longitudinal alignment therewith.

Figure 4:
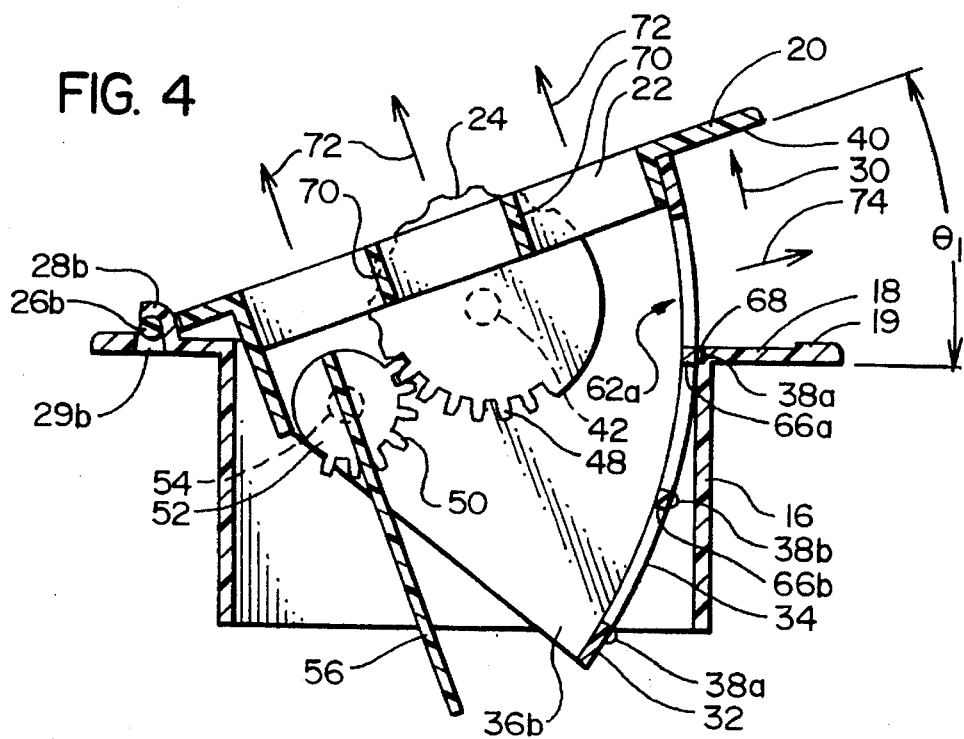
FIG. 4 is a cross-sectional view similar to FIG. 3, showing the deflector subassembly pivoted to a first open position ($\Theta_1$) and the control flap in the open position, so that a major portion of the airflow continues to be directed in a generally vertical direction while a smaller portion is deflected in a generally horizontal direction through the partially exposed secondary grate.

As the operator pivots the top plate of the deflector subassembly upwardly to the first open position, in the direction indicated by arrow 30, the front panel extends from within the interior of sleeve subassembly 14 until the first bank 62a of vent openings is exposed above perimeter flange 18, as is shown in FIG. 4. As this point is reached, the first set of lugs 38 (at the ends of rib 62a) move in sliding contact with the inner surface of sleeve 16, and then resiliently "snap" into and are received in corresponding open-topped notches 68 in the forward inner edge of flange portion 18. This holds the deflector subassembly in its first deployed angular position ($\Theta_1$), against gravity or a light downward pressure which might otherwise cause the assembly to accidentally close. However, when a stronger downward pressure is applied to the top plate by the operator so as to intentionally close the assembly, stringers 66 bend resiliently inwardly and the rounded outer surfaces of the lugs 38 ride over the lower lips of notches 68 so that the deflector subassembly pivots downwardly toward the closed position shown in FIG. 3.

In the configuration which is shown in FIG. 4, the control flapper 56 is disposed downwardly into the throat of the flange subassembly and generally perpendicular to the primary grate 22. In this position, flow through both the duct opening (i.e., flow through the sleeve portion of the flange subassembly) and the primary grate 22 is unrestricted. As a result, the greater portion of the air flow continues to pass through the primary grate, although it is deflected somewhat from the previous vertical path by the vanes 70, as indicated by flow arrows 72. At the same time, because the primary flow path remains unobstructed, relatively little air escapes through the first bank 62a of vent openings, in the direction indicated by arrow 74.

Accordingly, this configuration has two functions. Firstly, it provides a stand-by position in which the device is readied for full deflection of the airflow (as will be described below with reference to FIG. 5), but in which the major portion of the airflow continues to follow a generally upward path. Secondly, because the upward airflow is deflected from vertical to a certain extent (e.g., 15° from vertical in the first position), this can be directed towards a fogged-up window or other selected location.

Figure 5:
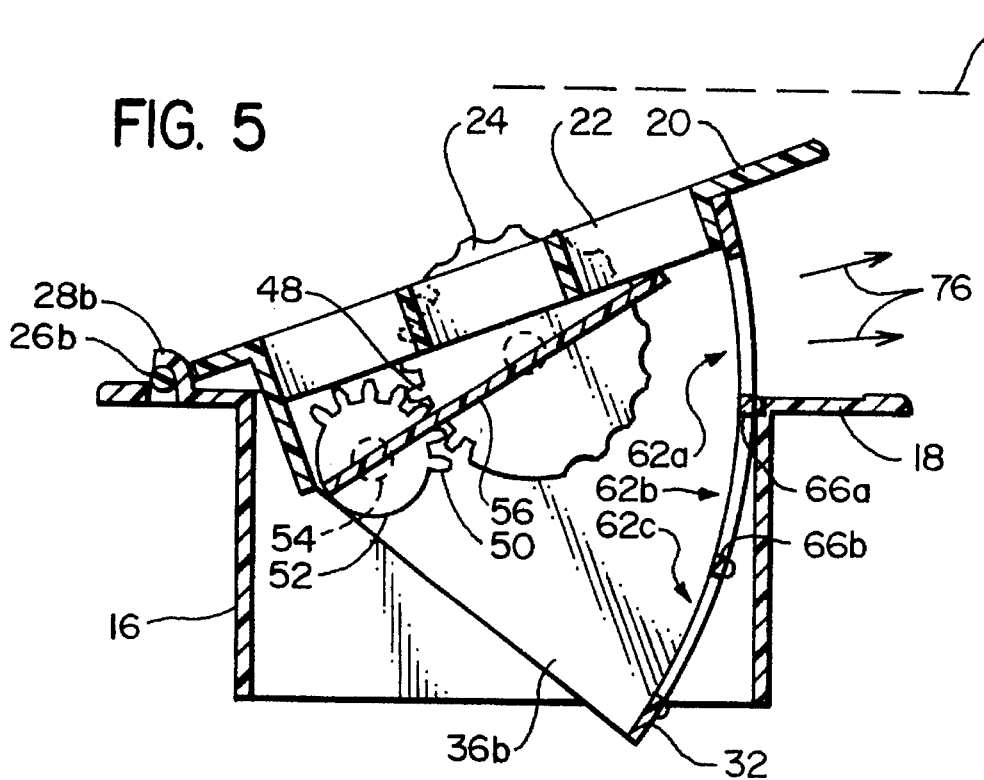
FIG. 5 is a cross-sectional view similar to FIGS. 3–4, showing the deflector subassembly extended to the same position as shown in FIG. 4, but with the control flap having been rotated to a position in which it restricts the flow of air through the primary grate and directs the major portion of the flow in a generally horizontal direction through the exposed portion of the secondary grate.

To deflect the airflow in the horizontal direction, in turn, the operator rotates thumb wheel 24, as described above with regard to FIG. 3, so as to move control flapper 56 to the position which is shown in FIG. 5. In this position, the flapper extends generally parallel and adjacent to primary grate 22, so as to block the openings thereof. As a result, substantially the entire airflow is directed out through the exposed bank 62a of vent openings, in the generally forward, horizontal direction which is indicated by flow arrows 76. Also, because the axis of the pivot pin 54 about which gear wheel 52 and the rearward edge of flapper 56 pivot is located near the rearward edge of the top plate and somewhat below the underside of primary grate 22, flapper 56 is orientated (when in the full deflection configuration shown in FIG. 5) as an inclined plane which slopes upwardly toward the forward edge of the deflector assembly, which assists in directing the airflow outwardly through the vent openings in front panel 32.

As can be seen in FIG. 5, a particular advantage which is provided by virtue of the rear-hinged deflector subassembly 12 is that (unlike the prior art devices discussed above) the register assembly of the present invention is capable of achieving a forwardly directed flow of air, even in situations where there is severely restricted vertical clearance, such as may be caused by the underside of a chair or other piece of furniture, as indicated by dotted line 77.

Figure 6:
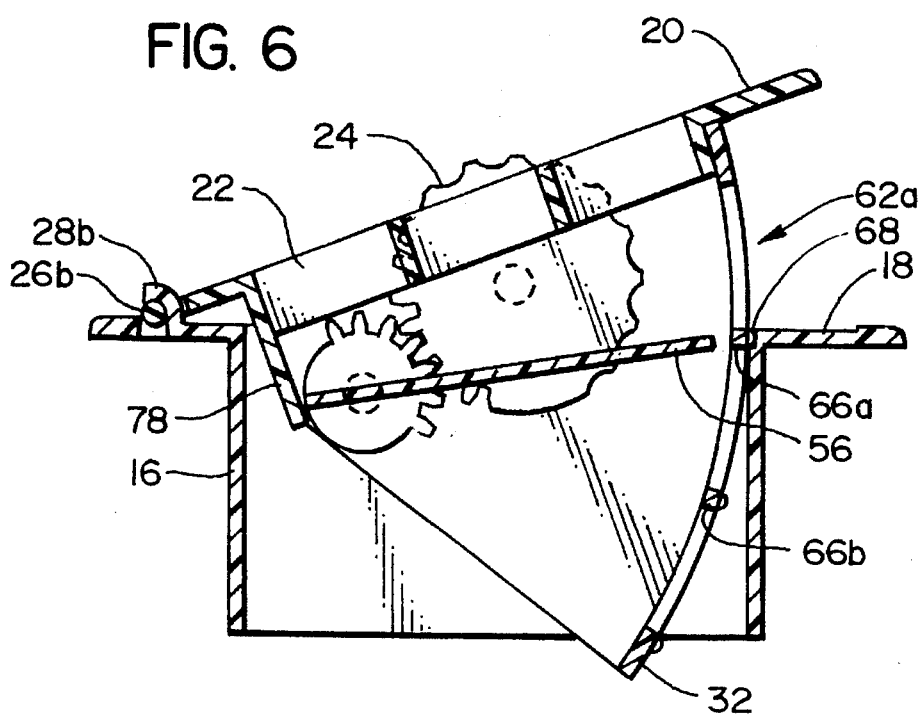
FIG. 6 is a cross-sectional view similar to FIGS. 3–5, showing the deflector assembly pivoted to the same position as shown in FIG. 5, but with the control flap having been rotated to a position in which it blocks substantially the entire flow of air through the ventilator.

As can be seen in FIG. 6, the operator is also able to use thumb wheel 24 to position the control flapper 56 in a third angular orientation in which it restricts or substantially blocks off the flow of air from the register. In this position, the forward edge of the flapper is located closely adjacent the stringer 66 which is positioned at the flange edge; this, in combination with the tight fit of the stringer against the inner edge of flange 18 and the close proximity of the depending panel portion 28 to the flange at the rearward edge of the assembly, provides a substantially continuous barrier which prevents any significant flow of air. Furthermore, the operator can selectively adjust control flapper 56 to any position between those which are shown in FIGS. 5 and 6, so as to selectively restrict or reduce but not entirely eliminate the flow of air.

FIGS. 7 and 8 show the deflector subassembly further extended to wider openings. To achieve this, the operator grips the top plate 20 under perimeter flange 18 and pulls upwardly, further pivoting the subassembly in the direction which is indicated by arrow 30. Because the top ends of retaining notches 68 are open, the only resistance which the subassembly offers to this pivoting motion is the frictional engagement of the front panel and end plates against the inner surfaces of sleeve 16.

As the subassembly is pivoted further open, the lugs 38 at the second stringer 66b "snap" into place in notches 68 so as to retain the deflector subassembly in its intermediate angular orientation Θ₂, in which the first and second banks 62a, 62b of openings in the secondary grate are opened for the passage of air therethrough, thereby increasing the total flow of air in the deflected direction which is indicated by arrows 84. Further opening of the subassembly brings the final set of lugs 38 at the lower edge of the front panel into engagement with the retaining notches at angular orientation Θ₃, which represents the maximum extension of the secondary grate of the device. In this position, all three banks 62a, 62b, and 62c of openings in the secondary grate are exposed, so as to maximize the airflow which is deflected in the generally horizontal direction which is indicated by flow arrows 84. In this final orientation, the lower edge 82 of the front panel rides up against and frictionally engages the inner edge of flange 18 in a manner similar to the two stringers 66a, 66b when they are in this position.

In the manner described above, thumb wheel 24 can be employed to adjustably control or block the flow of air through the primary and secondary grates of the assembly in either of the positions which are shown in FIGS. 7 and 8.

Thus, by raising or lowering the front panel 32 of the deflector subassembly so as to increase/decrease the number of banks 62 of openings which are exposed, the operator is able to selectively adjust the amount of air which is supplied through the register and diverted in a generally horizontal, forward direction. It will also be understood that, while the embodiment which is illustrated is provided with three banks of vent holes, the device may be provided with any number of these which may be desired.

The vent register assembly of the present invention may be formed of any suitable material, however, injection molded plastic has been found eminently suitable for this purpose, not only from the standpoint of economy of manufacture, but also by virtue of its durability, appearance, resilient flexibility, and relatively low coefficient of friction.

Figure 9:
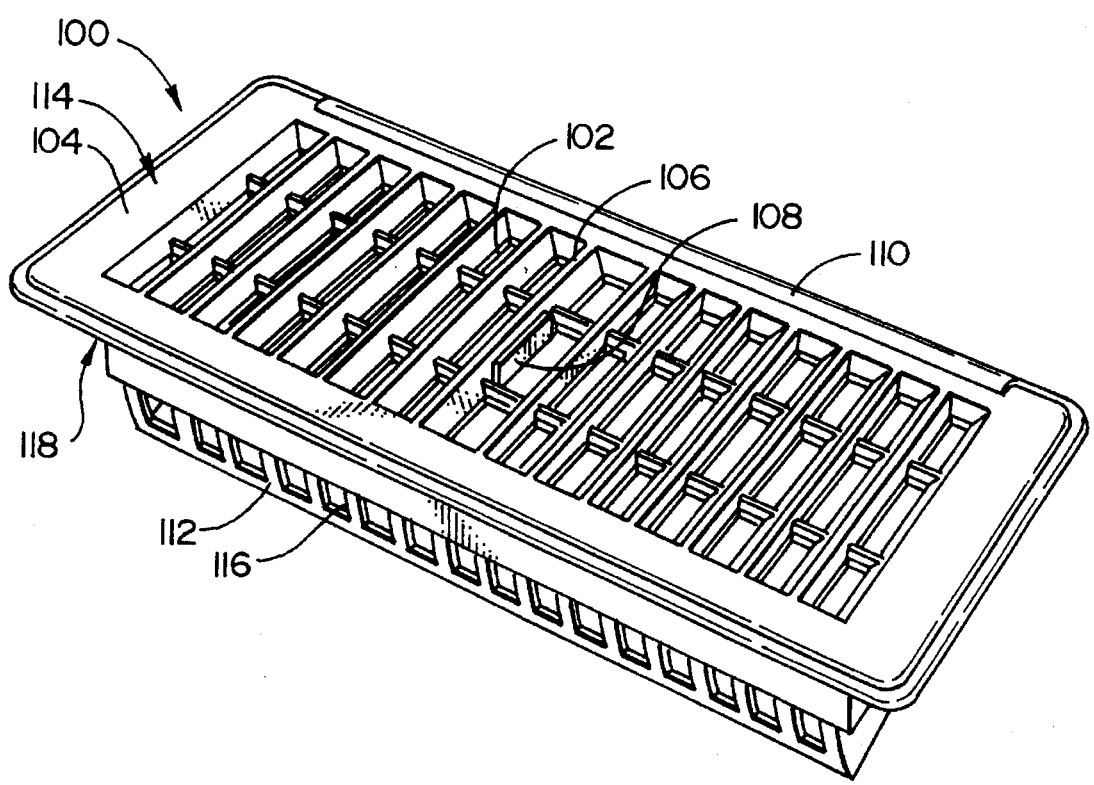
FIG. 9 is a perspective view of a directional vent assembly in accordance with an embodiment of the present invention in which the pivoting control flap is replaced by sliding control panel having openings which move into and out of alignment with those in the primary grill.

FIG. 9 is a perspective view of a directional register assembly 100 in which the flow of air through the grills is controlled by a sliding closure panel 102 which is mounted in the top plate 104 so as to selectively open and close the openings in the primary grill 106, using a manually operated control tab 108 which is mounted to the sliding panel so as to shift this end-wise between a first position in which openings in the control plate are aligned with those in the primary grill so as to allow the unimpeded flow of air therethrough and a second position in which closed portions of the panel are aligned with and block off the openings. By positioning the control panel and intermediate positions, i.e., with the grill partially opened, the flow of air passing through the primary grill can be increased/decreased between these two extremes, conversely decreasing/increasing the flow of air which is directed through the secondary grill 110 when the latter is exposed. The top panel assembly, including the grate and sliding control plate mechanism, but not the other elements of the embodiment which is shown in FIG. 9, are essentially similar to the corresponding portions of the heat register which is disclosed in U.S. Pat. No. Des. 315,790.

FIG. 9 also shows the use of a live hinge 110 formed in the flexible plastic material of the assembly, in place of the hook-and-pivot pin hinge mechanism of the embodiment which was described above. The remainder of the register assembly 100 is generally similar to that which has been described above, inasmuch as the pivoting deflector assembly 114 is provided with the downwardly curved secondary grate 116 which extends downwardly from the top plate through the flange assembly 118, so that the secondary grate is opened as the top panel is pivoted upwardly.

It will be understood that many modifications to the present invention and variations thereon will be obvious to those skilled in the art without departing from the basic spirit thereof. Accordingly, the present invention is not to be limited except as by the appended claims.

What is claimed is:

1. A ventilation register for selectively diverting a flow of air passing therethrough, said register comprising:

a fixed flange section configured to be mounted to a discharge opening of a ventilation duct;

a pivoting deflector section for selectively diverting a flow of air from said duct opening, said deflector section comprising:

a top plate portion having a primary grill formed therein for passage of said flow of air therethrough; and a front panel portion extending downwardly from a front edge of said top plate portion and having a secondary grill formed therein for passage of said flow of air therethrough, said secondary grill portion of said front panel member having at least one opening which extends downwardly therein over an angular distance, so that pivoting said deflector assembly upwardly from a first angular position to a second angular position increases an area of said opening which is exposed above said flange portion, so as to increase an amount of said air flow which can pass through said secondary grill opening;

hinge means interconnecting a rearward edge of said top plate portion of said deflector section to a rearward edge of said fixed flange section so as to permit said deflector section to be pivoted from a first position in which said top plate portion thereof abuts and lies substantially flush with a horizontal upper surface of said flange section so that said flow of air passes through said primary grill in a generally vertical direction, to a second position in which said front panel portion is fully extended above said upper surface of said flange section so as to permit at least a portion of said flow of air to be deflected through said secondary grill in a generally horizontal direction;

means for selective angular positioning of said pivoting deflector section at one or more intermediate angles between said first position in which said top plate abuts said fixed flange section and said second position in which said secondary grill is fully exposed; and means for selectively proportioning said flow of air which passes through said primary and secondary grills when said pivoting section is in said fully exposed or intermediate positions.

2. The ventilation register of claim 1, wherein said means for selectively proportioning said flow of air comprises:

a flap member having a first position in which said flow of air is directed by said flap member through said primary grill in said top plate and a second position in which said flow of air is directed by said flap member through said secondary grill in said front panel.

3. The ventilation register of claim 2, wherein said fixed flange section comprises:

a generally rectangular, vertically-extending sleeve portion which is configured to be received in said discharge opening of said ventilator duct.

4. The ventilation register of claim 3, wherein said front panel portion of said deflector section comprises:

an arcuate panel member which extends downwardly from said forward edge of said top plate portion and is received in said sleeve portion of said fixed flange section, said panel member having a curved outer surface which is configured to tangentially abut an inner surface of said sleeve portion as said deflector section is pivoted about said hinge means.

5. The ventilation register of claim 4, wherein said means for selective angular positioning of said pivoting deflector section at said intermediate angles comprises:

said curved outer surface of said curve panel member frictionally engages said inner surface of said sleeve portion so as to form a sliding fit therewith.

6. The ventilation register of claim 4, wherein said means for selective angular positioning of said pivoting deflector section at said intermediate angles comprises;

at least one lug member which extends outwardly from said arcuate panel member; and at least one receptacle formed in said inner surface of said sleeve portion for receiving said lug member so as to hold said deflector section in said angular orientation.

7. The ventilation register of claim 1 wherein said means for selectively proportioning said air flow comprises:

a sliding closure panel; and means for slidably mounting said sliding closure panel to said top plate portion, so as to control the quantity of said flow of air which passes therethrough relative to the quantity of said flow of air which passes through said secondary grill.

8. The ventilation register of claim 7, wherein said sliding closure panel comprises:

a control plate, said control plate having a plurality of apertures, such that when said control plate is placed in a first position said apertures of said control plate align with apertures in said primary grill so as to permit said flow of air to pass therethrough, and when said control plate is placed in a second position said control plate and said primary grill together block said flow of air therethrough; and an actuating member for enabling said control plate to be moved from said first position to said second position, said actuating means being configured so that said control plate may also be placed in at least one intermediate position between said first position and said second position in which said apertures in said primary grill are partially opened so as to permit a portion of said flow of air to pass therethrough.

9. The ventilation register of claim 8, wherein said front panel portion of said deflector section comprises:

an arcuate panel member which extends downwardly from said forward edge of said top plate portion and is received in said sleeve portion of said fixed flange section, said panel member having a curved outer surface which is configured to tangentially abut an inner surface of said sleeve portion as said deflector section is pivoted about said hinge means.

10. The ventilation register of claim 9, wherein said means for selectively positioning said pivoting deflector section comprises:

a sliding fit where said curved panel member frictionally engages said inner surface of said sleeve portion so as to allow angular adjustment to said pivoting deflector.

11. The ventilation register of claim 9, wherein said means for angularly adjusting said pivoting deflector section comprises:

at least one lug member which extends outwardly from said arcuate panel member; and at least one receptacle formed in said inner surface of said sleeve portion for receiving said lug member so as to hold said deflector section in said angular orientation.

12. The ventilation register of claim 3, wherein said fixed flange section further comprises a perimeter flange member mounted around an upper end of said sleeve portion for extending outwardly therefrom in flat abutment with a floor surface.

13. The ventilation register of claim 12, wherein said hinge means comprises:

at least one hinge member interconnecting said top plate portion and said fixed flange section at a location proximate an outer edge of said perimeter flange member, so that said hinge member is spaced outwardly from said sleeve portion and in a location at which an underlying floor surface will provide support for said hinge member against the weight of a person stepping on said top plate portion of said register.

14. A ventilation register for selectively diverting a flow of air passing therethrough, said register comprising:

(A) a fixed flange section configured to be mounted to a discharge opening of a ventilation duct, said fixed flange section comprises:

(i) a generally rectangular, vertically-extending sleeve portion which is configured to be received in said discharge opening of said ventilation duct; and (ii) a perimeter flange portion which extends around an upper end of said sleeve portion, so as to retain said fixed flange section in place, and so as to form a trim piece which covers the area between said discharge opening of said ventilation duct and a floor;

(B) a pivoting deflector section for selectively diverting a flow of air from said duct opening, said deflector section comprising;

(i) a top plate portion, said top plate portion comprising:
    a primary grill formed therein for passage of said flow of air therethrough;
    a sliding closure panel, said sliding closure panel comprising:
        a control plate, said control plate having a plurality of openings, such that when said control plate is placed in a first position said openings of said control plate align with openings in said primary grill so as to permit said flow of air therethrough, and when said control plate is placed in a second position said control plate and said primary grill together block said flow of air therethrough;
        means for slidably mounting said sliding closure panel to said top plate portion, so as to allow the adjustment of said flow of air therethrough; and
        a manual control tab for moving said control plate from said first position to said second position, and so that said control plate may be selectively placed in at least one intermediate position between said first position and said second position;
(ii) a front panel portion extending downwardly from a front edge of said top plate portion, said front panel portion comprising:
    an arcuate panel member which extends downwardly from said forward edge of said top plate portion and is received in said sleeve portion of said fixed flange section, said panel member having a curved outer surface which is configured to tangentially abut an inner surface of said sleeve portion as said deflector section is pivoted about a hinge means; and
    a secondary grill formed in said front panel portion for passage of said flow of air therethrough, said secondary grill portion of said front panel member having at least one opening which extends downwardly therein over a predetermined angular distance, so that pivoting said deflector assembly upwardly from a first angular position to a second angular position increases an area of said opening which is exposed above said sleeve portion, so as to increase an amount of said air flow which can pass through said secondary grill opening;

(C) binge means interconnecting a rearward edge of said top plate portion of said deflector section to a rearward edge of said fixed flange section so as to permit said deflector section to be pivoted from a first position in which said top plate portion thereof abuts and lies substantially flush with a horizontal upper surface of said flange section so that said flow of air passes through said primary grill in a generally vertical direction, to a second position in which said front panel portion is fully extended above said upper surface of said flange section so as to permit at least a portion of said flow of air to be deflected through said secondary grill in a generally horizontal direction, said hinge means comprising:
    at least one hinge member interconnecting said top plate portion and said fixed flange section at a location proximate an outer edge of said perimeter flange member, so that said hinge member is spaced outwardly from said sleeve portion and in a location at which an underlying floor surface will provide support for said hinge member against the weight of a person stepping on said top plate portion of said register; and (D) means for angularly adjusting said pivoting deflector section, so that said pivoting deflector section can be positioned at one or more intermediate angles between a first position where said pivoting deflector section abuts said fixed flange section and a second position where said secondary grill is fully exposed, said means for angularly adjusting said pivoting deflector section comprising:
    at least one lug member which extends outwardly from said arcuate panel member; and
    at least one receptacle formed in said inner surface of said sleeve portion for receiving said lug member so as to hold said deflector section in said angular orientation.

\* \* \* \* \*